(12) United States Patent
Finstad et al.

(10) Patent No.: US 10,766,516 B2
(45) Date of Patent: Sep. 8, 2020

(54) MODULAR CARTS

(71) Applicant: Cannon Equipment LLC, Cannon Falls, MN (US)

(72) Inventors: Clemance Bernard Finstad, Bay City, WI (US); Thomas J. Raway, Hastings, MN (US); Bruce L. Johnson, Cannon Falls, MN (US)

(73) Assignee: Cannon Equipment LLC, Cannon Falls, MN (US)

( * ) Notice: Subject to any disclaimer, the term of this patent is extended or adjusted under 35 U.S.C. 154(b) by 0 days.

(21) Appl. No.: 16/119,114

(22) Filed: Aug. 31, 2018

(65) Prior Publication Data

US 2019/0071110 A1 Mar. 7, 2019

Related U.S. Application Data

(60) Provisional application No. 62/553,221, filed on Sep. 1, 2017.

(51) Int. Cl.
*B62B 3/18* (2006.01)
*B62B 3/00* (2006.01)

(52) U.S. Cl.
CPC ............... *B62B 3/18* (2013.01); *B62B 3/002* (2013.01); *B62B 2207/02* (2013.01)

(58) Field of Classification Search
CPC .......... B62B 3/002; B62B 3/005; B62B 3/02; B62B 2207/02
USPC ....................................................... 280/79.3
See application file for complete search history.

(56) References Cited

U.S. PATENT DOCUMENTS

| | | | |
|---|---|---|---|
| 2,598,800 A | 6/1952 | Kopper | |
| 2,647,287 A | 8/1953 | Jones | |
| 3,191,959 A | 6/1965 | Heimbruch et al. | |
| 3,628,805 A | 12/1971 | Archer | |
| 3,840,242 A | 10/1974 | Craig, Sr. et al. | |
| 3,920,258 A * | 11/1975 | Lundstrom | B62B 3/186 280/33.996 |
| 3,953,044 A * | 4/1976 | Wilson | B62B 3/025 280/33.996 |
| 3,971,568 A | 7/1976 | Wright | |
| 3,977,689 A | 8/1976 | Rosa | |

(Continued)

FOREIGN PATENT DOCUMENTS

| FR | 2849637 | 1/2003 |
|---|---|---|
| JP | 2002114340 | 4/2002 |

OTHER PUBLICATIONS https://www.taiwantrade.com/product/standard-picking-ladder-cart-829794.html visited on Dec. 16, 2016.

*Primary Examiner* — Jeffrey J Restifo
(74) *Attorney, Agent, or Firm* — Andrus Intellectual Property Law, LLP

(57) ABSTRACT

A modular cart assembly includes a first cart and an identical second cart. Each cart has a latching assembly that vertically slides along the cart and a coupling arm spaced apart from the latching assembly. The first cart is coupled to the second cart by positioning the first cart next to the second cart, vertically sliding the latching assembly of the first cart along the first cart until the latching assembly of the first cart couples to the coupling arm of the second cart, and vertically sliding the latching assembly of the second cart along the second cart until the latching assembly of the second cart couples to the coupling arm of the first cart.

13 Claims, 8 Drawing Sheets

(56) References Cited

U.S. PATENT DOCUMENTS

| | | | |
|---|---|---|---|
| 3,981,510 A | 9/1976 | Gustafsson | |
| 3,984,117 A | 10/1976 | Bates et al. | |
| 4,045,043 A | 8/1977 | Fourrey | |
| 4,065,141 A | 12/1977 | Wilson | |
| 4,097,097 A | 6/1978 | Hosko | |
| 4,159,831 A * | 7/1979 | Schorr | B62B 3/004 |
| | | | 211/49.1 |
| 4,180,277 A * | 12/1979 | Romero | A47F 5/135 |
| | | | 220/485 |
| 4,222,579 A * | 9/1980 | Frydendal | B62B 3/186 |
| | | | 211/181.1 |
| 4,263,749 A | 4/1981 | McDougle | |
| 4,678,090 A | 7/1987 | Ross | |
| 4,725,066 A | 2/1988 | Nootenboom et al. | |
| 4,895,382 A | 1/1990 | Andersson | |
| 4,986,555 A * | 1/1991 | Andreen | A47L 13/10 |
| | | | 280/47.35 |
| 5,170,529 A | 12/1992 | Kovacs | |
| 5,259,668 A * | 11/1993 | Teufel | B62B 3/006 |
| | | | 312/249.11 |
| 5,263,701 A | 11/1993 | Kleinhen | |
| 5,324,054 A * | 6/1994 | Kleier | B62B 3/002 |
| | | | 220/485 |
| 5,480,187 A * | 1/1996 | Binning | B62B 3/025 |
| | | | 280/79.2 |
| 5,871,108 A * | 2/1999 | White | A47F 5/10 |
| | | | 108/108 |
| 5,873,204 A | 2/1999 | Gehn et al. | |
| 5,947,494 A | 9/1999 | Thogersen et al. | |
| 6,331,009 B1 | 12/2001 | Wilkinson | |
| 6,659,294 B1 * | 12/2003 | Simard | A47F 5/01 |
| | | | 108/147.11 |
| 6,793,630 B2 * | 9/2004 | Labrecque | A61D 3/00 |
| | | | 119/453 |
| 6,811,163 B1 * | 11/2004 | Gurule | B62B 3/002 |
| | | | 280/79.3 |
| 6,974,042 B2 | 12/2005 | Hall | |
| 7,025,548 B2 | 4/2006 | Krawczyk et al. | |
| 7,130,190 B1 * | 10/2006 | Baker | G06F 1/1632 |
| | | | 361/695 |
| 7,185,899 B2 | 3/2007 | Thiede et al. | |
| 7,213,816 B2 | 5/2007 | Gregory et al. | |
| 7,229,085 B2 * | 6/2007 | Pederson | A63B 47/00 |
| | | | 280/79.3 |
| 7,320,472 B2 | 1/2008 | Gregory et al. | |
| 7,392,993 B1 * | 7/2008 | Prohl | A47F 5/137 |
| | | | 280/33.998 |
| 7,419,063 B1 | 9/2008 | Hall | |
| 7,484,631 B2 * | 2/2009 | Bothun | A47B 53/02 |
| | | | 211/162 |
| 7,540,510 B2 * | 6/2009 | Sparkowski | A47F 5/137 |
| | | | 108/106 |
| 7,993,095 B2 * | 8/2011 | Reichler | B65G 57/24 |
| | | | 414/789.5 |
| 8,739,986 B2 * | 6/2014 | Preidt | A47F 5/00 |
| | | | 108/187 |
| 8,764,031 B2 * | 7/2014 | Finstad, III | A47B 57/06 |
| | | | 211/187 |
| 8,931,420 B2 * | 1/2015 | Larson | B62B 3/02 |
| | | | 108/54.1 |
| 9,139,331 B2 * | 9/2015 | Tavolino | B65D 7/12 |
| 9,149,114 B2 | 10/2015 | Finstad, III et al. | |
| 9,211,900 B2 * | 12/2015 | Knepp | B62B 3/08 |
| 9,227,645 B2 * | 1/2016 | Franco | B60K 7/0007 |
| 9,283,975 B2 * | 3/2016 | McClanahan | B62B 3/02 |
| 9,428,205 B2 | 8/2016 | Jackson et al. | |
| 9,738,447 B1 * | 8/2017 | Schaftenaar | B62B 3/005 |
| 9,751,549 B2 * | 9/2017 | McClanahan | B62B 3/02 |
| 10,092,098 B2 * | 10/2018 | Jackson | F16M 13/02 |
| 10,292,491 B1 * | 5/2019 | Ke | A47B 43/00 |
| 10,300,741 B2 * | 5/2019 | Finstad | B60B 33/02 |
| 10,336,360 B2 * | 7/2019 | Jackson | B62B 5/0495 |
| 2005/0235885 A1 | 10/2005 | Salmanson et al. | |
| 2006/0213402 A1 | 9/2006 | Grimal | |
| 2016/0082996 A1 * | 3/2016 | Jackson | B62B 3/025 |
| | | | 280/33.996 |
| 2016/0160561 A1 | 6/2016 | Yu | |
| 2017/0258222 A1 * | 9/2017 | Jackson | F16M 13/02 |
| 2018/0104986 A1 * | 4/2018 | Finstad | B60B 33/02 |

* cited by examiner

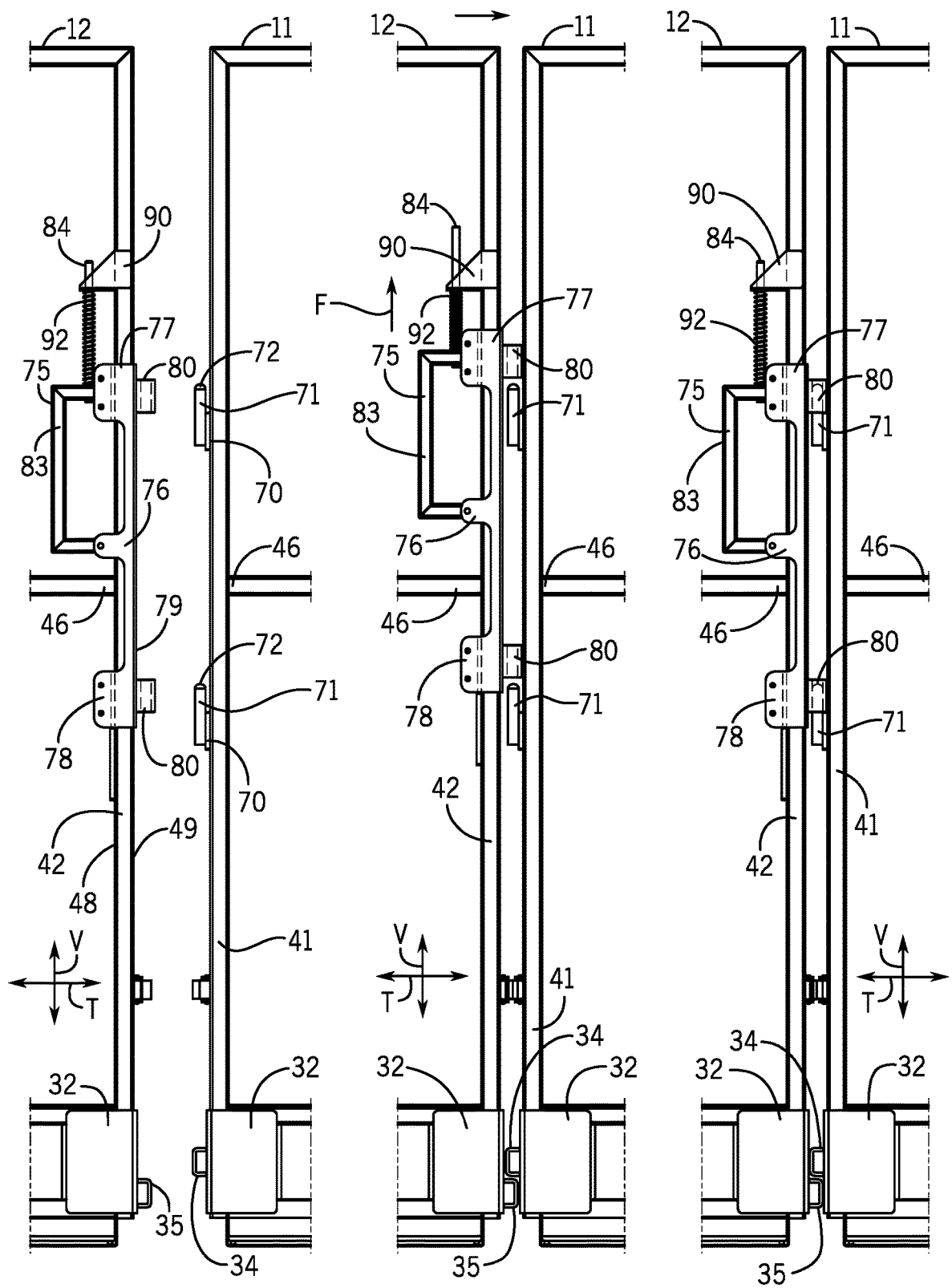

MODULAR CARTS

CROSS-REFERENCE TO RELATED APPLICATION

The present application is based on and claims priority to U.S. Provisional Patent Application No. 62/553,221 filed Sep. 1, 2017, the disclosure of which is incorporated herein by reference.

FIELD

The present disclosure relates to modular carts, and specifically relates to modular carts which can be coupled to each other in a side by side relationship.

BACKGROUND

The following U.S. Patent provides background information and is incorporated herein by reference in entirety.

U.S. Pat. No. 8,931,420 discloses a pallet or cart which can be coupled to a similar pallet or cart in a side by side relationship. The pallet or cart, at its one or right side, has a coupling, which cooperates with an associated coupling on the opposite or left side of an adjacent pallet or cart. The couplings and the associated couplings can be connected to connect the two pallets or carts together to make them capable of being moved together and even be lifted and lowered together by a standard lift truck or forklift or a standard pallet jack. The couplings are also releasable so that, when necessary, each pallet or cart may be used as would be a single pallet or cart. The pallet or cart may have one or more foldable shelves therein.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, the modular cart assembly has a first cart with a latching assembly that vertically slides along the first cart and a second cart with a coupling arm. The first cart is coupled to the second cart by positioning the first cart next to the second cart and vertically sliding the latching assembly along the first cart until the latching assembly couples to the coupling arm on the second cart.

In certain examples, a modular cart assembly has a first cart with a latching assembly movable along the first cart and a second cart having a pin. The latching assembly has a sleeve, and the first cart is coupled to the second cart by positioning the first cart next to the second cart and moving the latching assembly along the first cart such that the sleeve mounts onto the pin of the second cart.

In certain examples, a modular cart assembly includes a first cart and a second cart that each extend from a first side to a second side in a lateral direction, from front to back in a transverse direction that is perpendicular to the lateral direction, and from top to bottom in a vertical direction that is perpendicular to the lateral direction and perpendicular to the transverse direction. The front of the first cart has a first front surface positioned near the first side of the first cart and on which a coupling arm is positioned and a second front surface positioned near the second side of the first cart and along which a latching assembly vertically slides. The front of the second cart has a first front surface positioned near the first side of the second cart and on which a coupling arm is positioned and a second front surface positioned near the second side of the second cart and along which a latching assembly vertically slides. The first cart is coupled to the second cart by positioning the first cart next to the second cart such that the front of the first cart faces the front of the second cart, vertically sliding the latching assembly of the first cart along the second front surface of the first cart such that the latching assembly of the first cart couples to the coupling arm of the second cart, and vertically sliding the latching assembly of the second cart along the second front surface of the second cart such that the latching assembly of the second cart couples to the coupling arm of the first cart.

Various other features, objects, and advantages of the invention will be made apparent from the following description taken together with the drawings.

BRIEF DESCRIPTION OF THE DRAWINGS

The present disclosure is described with reference to the following Figures.

FIGS. 7-9 depict an example operational latching sequence for latching two carts together in a side by side relationship. FIG. 7 depicts the latching assembly in a rest position, FIG. 8 depicts the latching assembly in an unlocked position, and FIG. 9 depicts the latching assembly in a locked position.

DETAILED DESCRIPTION

Modular carts are used to collect and distribute items in warehouses, distribution centers, and retail stores. These modular carts can also be transported by railroad car or truck to different facilities where the items in the modular carts are used to restock shelving units. In certain examples, a modular cart can be lifted by a lift truck or forklift using forks that engage the bottom of the modular cart to load it into and unload it from the railroad car or truck.

The inventors of the present disclosure have endeavored to create improved modular carts and modular cart assemblies that can be used to transport items in warehouses, distribution centers, and retail stores. In some examples, the modular carts of the present disclosure are easily moved along horizontal surfaces and can be vertically lifted or lowered onto different surfaces, such as mezzanines, by forklifts or other machinery. In some examples, the modular carts of the present disclosure can be quickly coupled and decoupled from each other thereby increasing stocking efficiency and safety.

Figure 1:
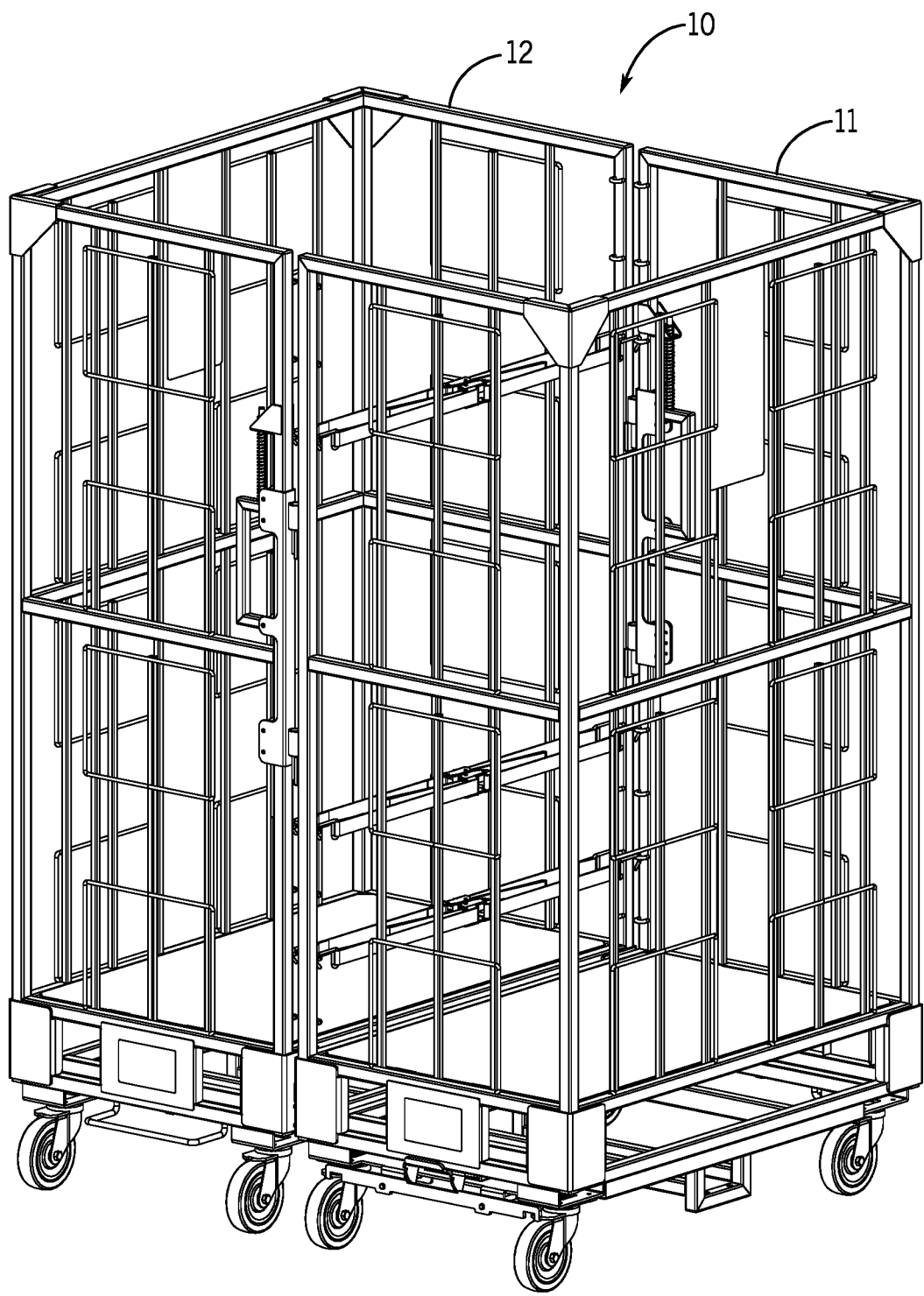
FIG. 1 is a perspective view of a modular cart assembly according to the present disclosure. Modular cart assembly shown includes two carts coupled together in a side by side relationship.
Figure 2:
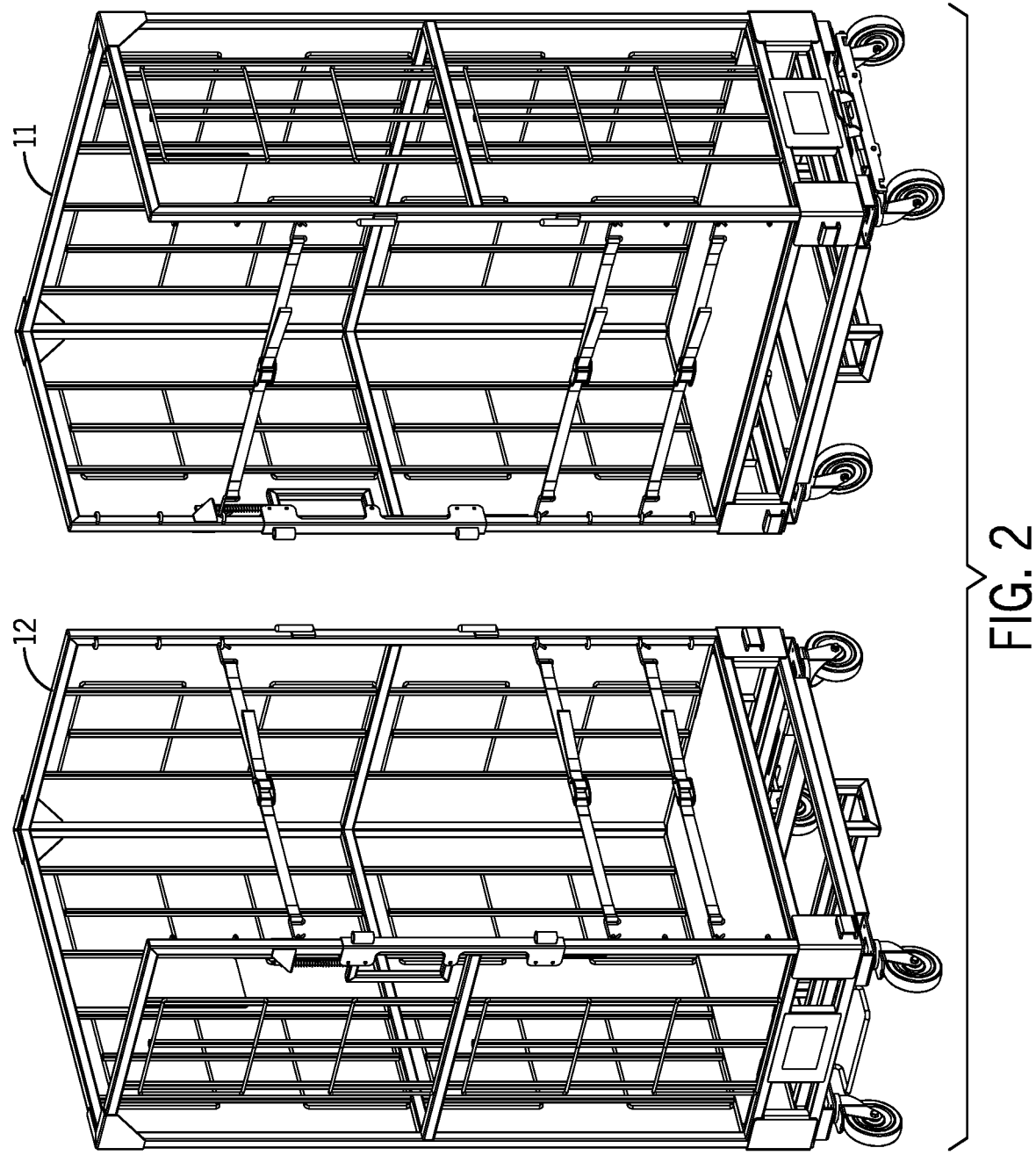
FIG. 2 depicts the carts shown in FIG. 1 decoupled from each other.

FIG. 1 depicts an example modular cart assembly 10 having two modular carts, namely a first modular cart 11 and a second modular cart 12, coupled to each other in a side by side relationship. The carts 11, 12 can be decoupled and spaced apart from each other, as shown in FIG. 2. The carts 11, 12 are identical, easily coupled to and decoupled from each other, moved together or separately, and lifted together or separately. The first cart 11 is depicted in FIGS. 3-4 and the features of the first cart 11 are described hereinbelow.

Figure 3:
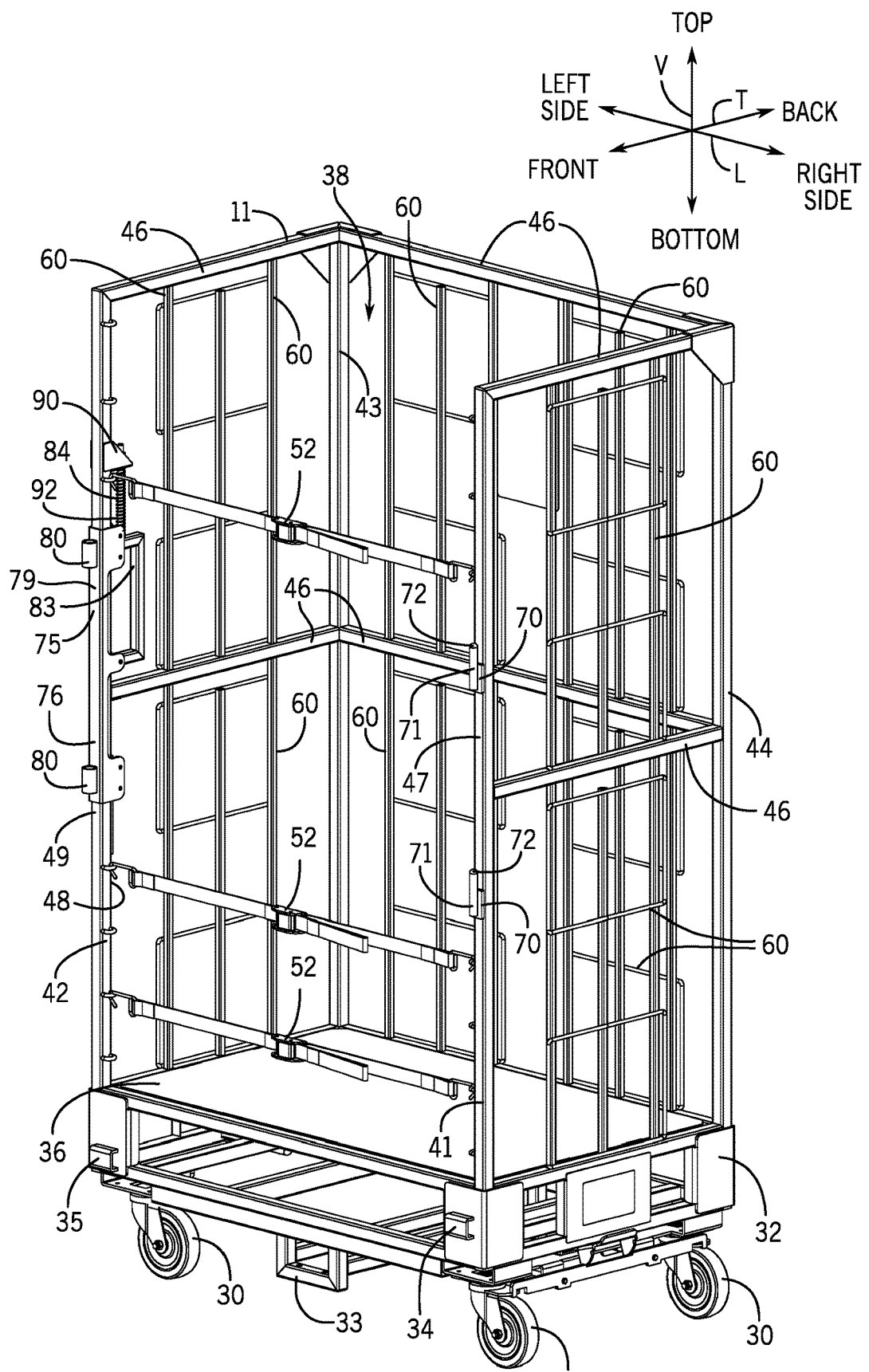
FIG. 3 depicts one of the carts shown in FIG. 1.
Figure 4:
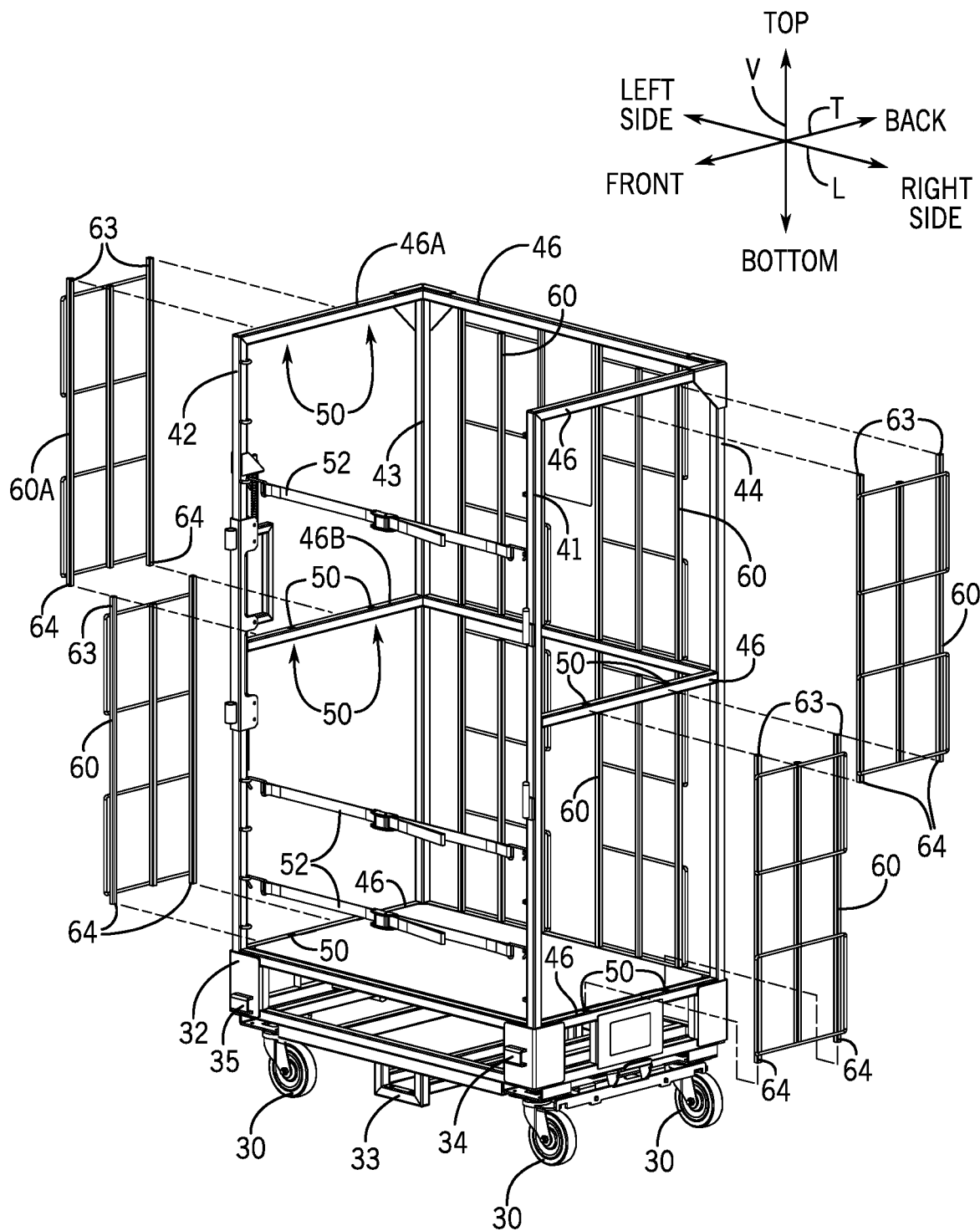
FIG. 4 depicts the cart shown in FIG. 3 with several removable panels separated from frame members of the cart.

Referring to FIGS. 3-4, the cart 11 generally extends from side (e.g. right side) to side (e.g. left side) in a lateral direction (see arrow L), from front to back in a transverse direction (see arrow T) is perpendicular to the lateral direction, and from top to bottom in a vertical direction (see arrow V) that is perpendicular to the lateral direction and perpendicular to the transverse direction.

The cart 11 is supported on a horizontal surface by ground engaging wheels 30 that are attached to a base frame 32 at the bottom of the cart 11. Items are placed into the interior space 38 defined by the cart 11 and supported on a platform 36 of the base frame 32. Shelves (not shown) can be included vertically above the platform 36. The base frame 32 includes a fork receiver 33 configured to receive a fork of a forklift (not shown) such that the cart 11 can be vertically lifted. The base frame 32 also includes lift brackets 34, 35 that extend in the transverse direction away from the front of the cart 11 and are configured to increase the rigidity of the cart assembly 10 when the two carts 11, 12 are vertically lifted together. The lift brackets 34, 35 are spaced apart from each other such that one lift bracket 34 is positioned near one side of the cart 11 and the other lift bracket 35 is positioned near the opposite side of the cart 11. The lift brackets 34, 35 are also vertically spaced apart from each other.

Vertical frame members 41, 42, 43, 44 vertically extend from the corners of the base frame 32 toward the top of the cart 11 and cross members 46 extend between the vertical frame members 41, 42, 43, 44 to thereby form the rigid frame of the cart 11. The vertical frame members 41, 42, 43, 44 and the cross members 46 generally define the sides, the front, and the back of the cart 11. However, cross members 46 do not extend between the vertical frame members 41, 42 located at the front of the cart 11 such that the front of the cart 11 is generally open. In certain applications, removable straps 52 are connected between the vertical frame member 41, 42 located at the front of the cart 11 to generally close the front of the cart 11 and prevent items from falling out through the front of the cart 11.

Figure 5:
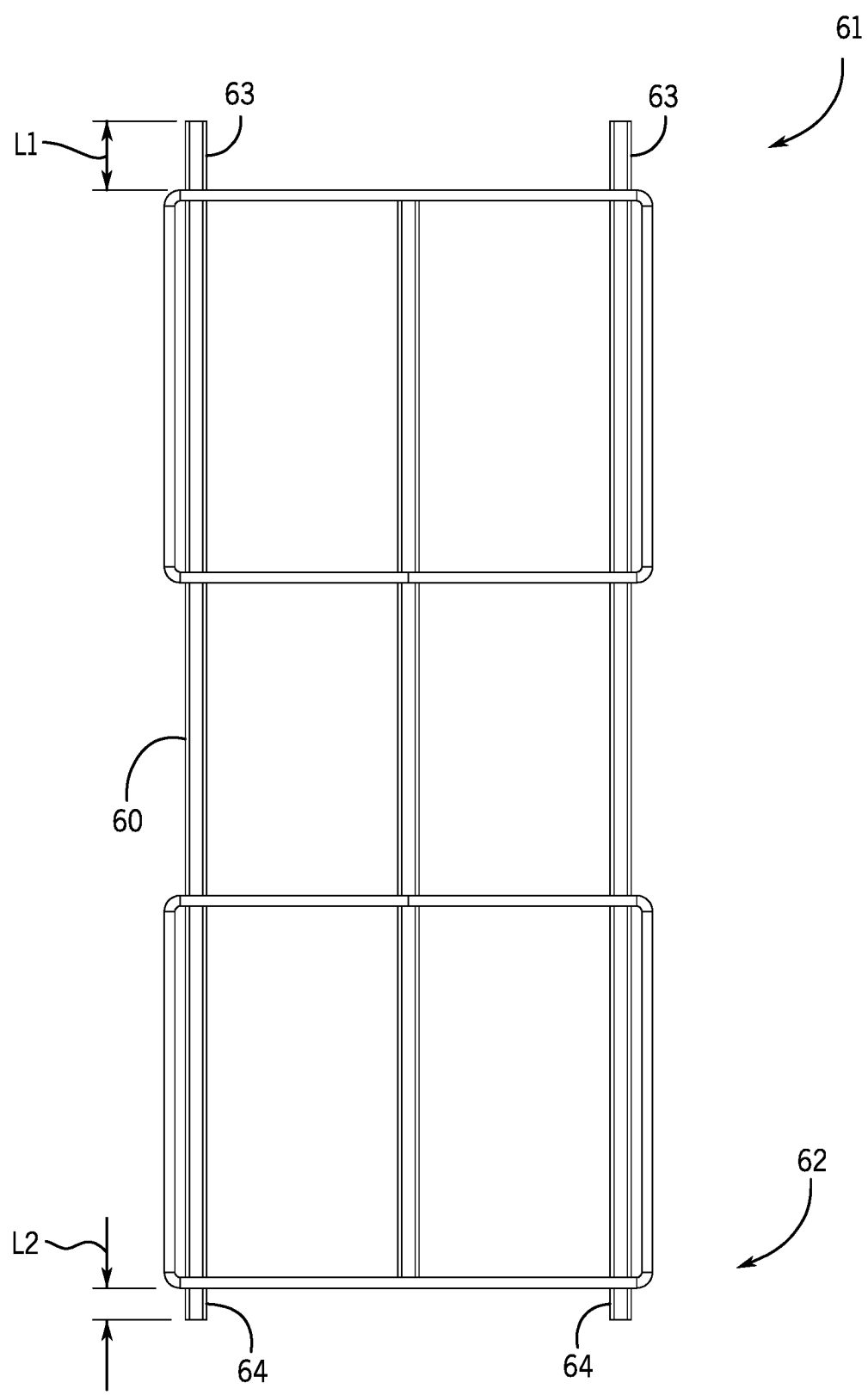
FIG. 5 is an example removable panel.

The sides and back of the cart 11 include one or more removable panels 60 (FIG. 5 depicts an example panel 60 in detail) that prevent items from falling out through the sides and back of the cart 11. Each panel 60 is generally planar and has a first end 61 with first fingers 63 extending in a first direction and an opposite second end 62 with second fingers 64 extending in a second direction opposite the first direction (see FIGS. 4-5).

Referring specifically to FIG. 4, an example coupling sequence for coupling one panel 60A to the cross members 46A, 46B that extend between the vertical frame members 42, 43 along the left side of the cart 11 is described below. The first panel 60A is coupled to the cross member 46A, 46B by first inserting the first fingers 63 into slots 50 defined in the bottom surface of the upper cross member 46A. The second fingers 64 are then inserted into the slots 50 defined in the upper surface of a lower cross member 46B. The length of the first fingers 63 (see L1 on FIG. 4) is greater than the length of the second fingers 64 (see L2 on FIG. 4) such that when the second fingers 64 are received and recessed into the slots 50 of the lower cross member 46B, as the panel 60A is moved by the operator or by gravity, the first fingers 63 remain in the slots 50 in the bottom surface of the upper cross member 46A (e.g. the first fingers 63 do not fully extend out of the slots 50). As such, the fingers 63, 64 prevent the panel 60A from inadvertently decoupling from the cross members 46A, 46B and tilting out of the plane defined by the left side of the cart 11. The panel 60A remains coupled to the cross members 46A, 46B until the operator vertically upwardly moves the panel 60A such that the second fingers 64 are moved out of the slots 50 of the upper surface of the lower cross member 46B and then vertically downwardly moves the panel 60A such that the first fingers 63 are moved out of the slots 50 in the bottom surface of the upper cross member 46A.

Returning to FIG. 3, the cart 11 includes at least one coupling arm 70 and a latching assembly 75, which are for coupling the first cart 11 to the second cart 12 (as shown in FIG. 1). The coupling arm 70 is positioned on a front surface 47 of the first vertical frame member 41 (note the first vertical frame member 41 is at the front right side of the cart 11). The coupling arm 70 projects and extends away from the front surface 47. The coupling arm 70 has a pin 71 that is vertically oriented such that the pin 71 extends parallel to the first vertical frame member 41. The pin 71 has a rounded tip. In the example depicted, the cart 11 includes two coupling arms 70 vertically spaced apart from each other along the front surface 47 of the first vertical frame member 41.

Figure 6:
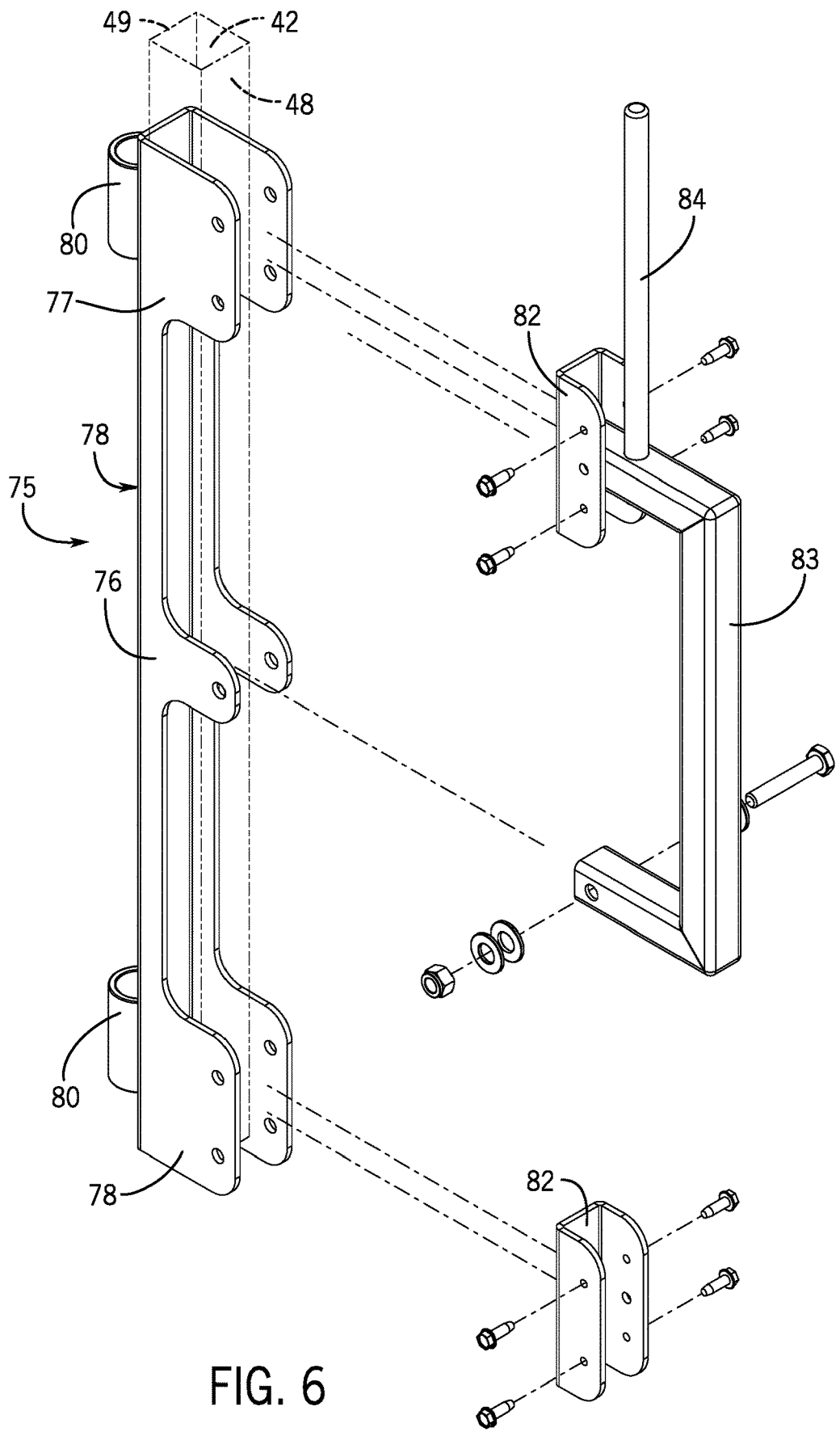
FIG. 6 is an exploded view of an example latching assembly according to the present disclosure.

The latching assembly 75 is slidably coupled to the second vertical frame member 42 (note the second vertical frame member 42 is at the front left side of the cart 11) such that the latching assembly 75 is near the left side of the cart 11 and opposite the coupling arm 70, which is near the right side of the cart 11 (FIG. 3). The components and features of the latching assembly 75 are shown in greater detail in FIG. 6 and described hereinbelow. The latching assembly 75 includes a channel 76 slidably received onto the second vertical frame member 42 (shown in dashed lines on FIG. 6) and having a first end 77 and an opposite second end 78. Closure members 82 couple to the channel 76 to thereby retain the channel 76 on the second vertical frame member 42 and sandwich the second vertical frame member 42 between the channel 76 and the closure members 82. The channel 76 is positioned along a front surface 49 of the second vertical frame member 42, and the closure members 82 are positioned along a back surface 48 of the second vertical frame member 42 (see FIGS. 3 and 6).

The channel 76 has an outer surface 79 (see also FIG. 3) to which at least one sleeve 80 is connected. The sleeves 80 project from the outer surface 79 and are vertically orientated. The number of sleeves 80 exemplary corresponds to the number of coupling arms 70 on the right side of the cart 11. In the example depicted in FIG. 3, two sleeves 80 are connected to the outer surface 79.

The latching assembly 75 also includes a handle 83 coupled to the channel 76. The handle 83 projects away from the back surface 48 of the second vertical frame member 42 and toward the back of the cart 11 (FIG. 3). A guide member 84 is coupled to the handle 83 and vertically upwardly extends away from the handle 83 and toward the top of the cart 11 (FIG. 3). The guide member 84 is slidably received by a guide bracket 90 (FIG. 3) that is on the second vertical frame member 42 and vertically above the latching assembly 75.

An example coupling sequence for coupling the right side of the first cart 11 to left side of the second cart 12 is depicted in FIGS. 7-9 and described herein below. Note that the example coupling sequence described herein below is repeated by the operator to thereby couple the left side of the first cart 11 to the right side of the second cart 12 and fully couple and latch the carts 11, 12 together.

FIG. 7 depicts the first cart 11 positioned next to the second cart 12 such that the fronts of the carts 11, 12 face each other (see also FIG. 2 which depicts the fronts of the carts 11, 12 extending toward each other). The right side of the first cart 11 is next to the left side of the second cart 12. The latching assembly 75 on the second vertical frame member 42 of the second cart 12 is in a rest position and positioned adjacent to the pins 71 on the first vertical frame member 41 of the first cart 11. The sleeves 80 transversely (e.g. horizontally) project toward the first cart 11 and the pins 71 transversely (e.g. horizontally) project toward the second cart 12. The latching assembly 75 is biased to the rest position by a spring 92 which is positioned on the guide member 84. The spring 92 extends between the handle 83 and the guide member 84. In addition, the second lift bracket 35 of the second cart 12 is adjacent to and vertically below the first lift bracket 34 of the first cart 11.

FIG. 8 depicts the second cart 12 pushed toward the first cart 11 and the latching assembly 75 moved (e.g. slid, translated) to an unlocked position such that the sleeves 80 of the latching assembly 75 are vertically spaced apart from the pins 71. The latching assembly 75 is moved into the unlocked position when an operator applies a vertically upwardly directed force F to the handle 83. As the latching assembly 75 is moved from the rest position (FIG. 7) to the unlocked position (FIG. 8), the guide member 84 vertically upwardly slides in and through the guide bracket 90 and the spring 92 is compressed between the guide bracket 90 and the handle 83. In addition, the second lift bracket 35 and the first lift bracket 34 contact each other.

FIG. 9 depicts the latching assembly 75 in a locked position in which the sleeves 80 are mounted onto the pins 71 and the carts 11, 12 are coupled together. The latching assembly 75 is moved from the unlocked position (FIG. 8) to the locked position (FIG. 9) by gravity and the spring 92 when the operator stops applying the vertically upwardly directed force F to the latching assembly 75. When the sleeves 80 are received onto the pins 71, the carts 11, 12 are restrained from moving in the transverse direction and the lateral direction (see FIG. 3) relative to each other. Furthermore, the lift brackets 34, 35 prevent the carts 11, 12 from moving in the vertical direction relative to each other. As the latching assembly 75 is moved from the unlocked position (FIG. 8) to the locked position (FIG. 9) the tapered end 72 of the pins 71 facilitates proper mounting of the sleeves 80 onto the pins 71 by aligning the sleeves 80 with the pins 71. The latching assembly 75 remains in the locked position (FIG. 9) until the operator reapplies the vertically upwardly directed force F to the handle 83. Note that the latching assembly 75 in the locked position (FIG. 9) is at the same vertical position along the second vertical frame member 42 as when the latching assembly 75 is in the rest position (FIG. 7).

Figure 10:
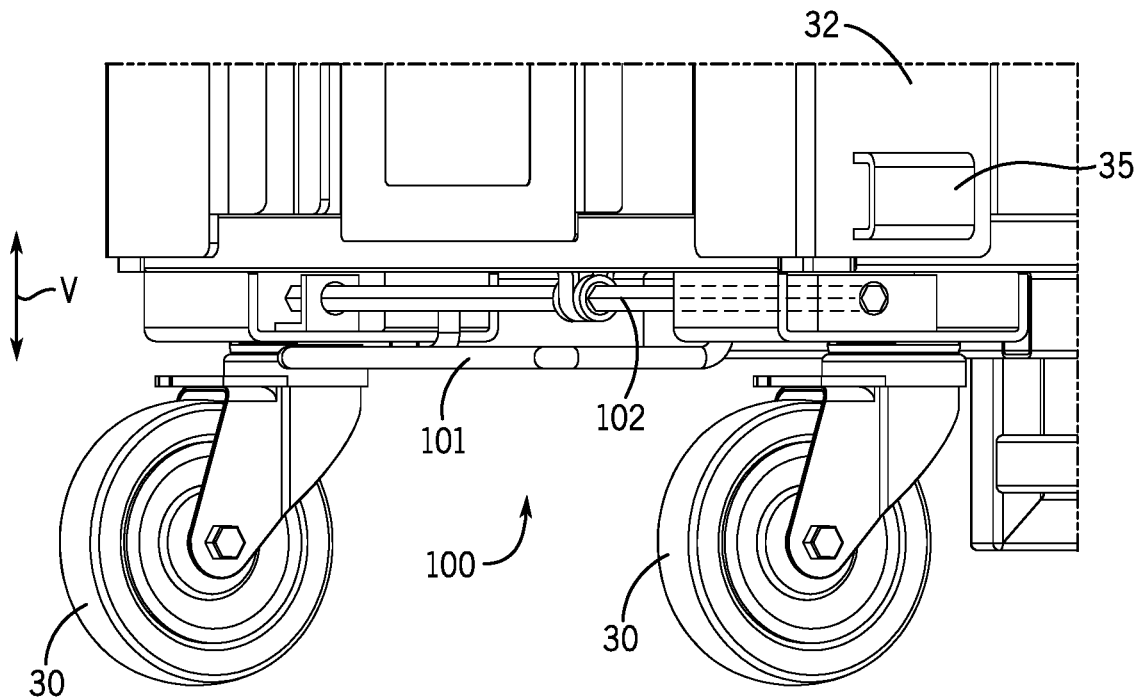
FIG. 10 depicts a wheel locking mechanism of the present disclosure in an unlocked position.
Figure 11:
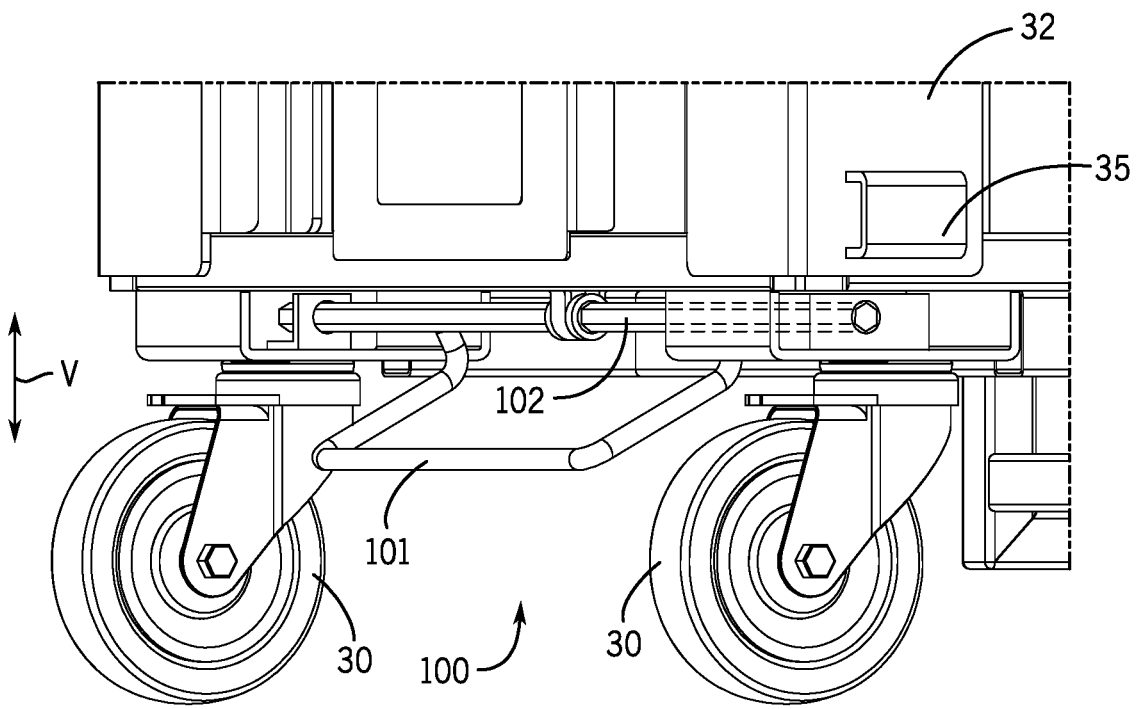
FIG. 11 depicts the wheel locking mechanism of FIG. 10 in a locked position.

FIG. 10-11 depict enlarged views of a lock assembly 40 coupled to the base frame 32. The lock assembly 100 is configured to prevent pivotal and/or rotational movement of at least one wheel 30. The lock assembly 100 has a pedal 101 coupled to a shaft 102 such that as the pedal 101 is moved the shaft 102 is rotated causing a cam (not shown) to move into contact with the wheel 30 which locks the wheel 30. FIG. 10 depicts the pedal 101 in an unlocked position, and FIG. 11 depicts the pedal 101 in a locked position. In operation, the pedal 101 can be moved from the unlocked position (FIG. 10) to the locked position (FIG. 11) by pushing down on the pedal 101. To move the pedal 101 from the locked position (FIG. 11) to the unlocked position (FIG. 10), the operator vertically lifts the pedal 101 with a foot.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claim is:

1. A modular cart assembly comprising:
a first cart having a latching assembly that vertically slides along the first cart;
a second cart having a coupling arm;
wherein the first cart is coupled to the second cart by positioning the first cart next to the second cart and vertically sliding the latching assembly along the first cart until the latching assembly couples to the coupling arm;
wherein the coupling arm comprises a pin that is vertically oriented;
wherein the latching assembly has a sleeve, and wherein as the latching assembly is vertically slid along the first cart the sleeve mounts onto the pin;
wherein the sleeve horizontally projects toward the second cart, and wherein the pin horizontally projects toward the first cart;
wherein the latching assembly is moveable between a locked position in which the sleeve is mounted onto the pin and an unlocked position in which the sleeve is vertically spaced apart from the pin;
wherein the first cart further comprises a spring that biases the latching assembly toward the locked position;
wherein the latching assembly has a guide member on which the spring is positioned; and
wherein the first cart further comprises a guide bracket in which the guide member is slidably received as the latching assembly is moved to the unlocked position.

2. The modular cart assembly according to claim 1, wherein the latching assembly has a handle from which the guide member extends, and wherein the spring is compressed between the handle and the guide bracket as the latching assembly is moved to the unlocked position.

3. A modular cart assembly comprising:
a first cart having a latching assembly movable along the first cart, the latching assembly having a sleeve; and
a second cart having a pin;
wherein the first cart is coupled to the second cart by positioning the first cart next to the second cart and moving the latching assembly along the first cart such that the sleeve mounts onto the pin;
wherein the pin is vertically oriented such that as the latching assembly is vertically translated along the first cart the sleeve mounts onto the pin;
wherein the latching assembly is moveable between a locked position in which the sleeve is mounted onto the pin and an unlocked position in which the sleeve is vertically spaced apart from the pin;

wherein the first cart further comprises a spring that biases the latching assembly toward the locked position;

wherein the latching assembly has a guide member on which the spring is positioned; and wherein the first cart further comprises a guide bracket that guides the guide member as the latching assembly is moved to the unlocked position.

4. The modular cart assembly according to claim 3, wherein the latching assembly has a handle from which the guide member extends, and wherein the spring is compressed between the handle and the guide bracket as the latching assembly is moved to the unlocked position.

5. A modular cart assembly comprising:

a first cart and a second cart that each extend from a first side to a second side in a lateral direction, from front to back in a transverse direction that is perpendicular to the lateral direction, and from top to bottom in a vertical direction that is perpendicular to the lateral direction and perpendicular to the transverse direction;

wherein the front of the first cart has a first vertically extending front surface positioned near the first side of the first cart and a second vertically extending front surface positioned near the second side of the first cart, the first cart further comprises a coupling arm positioned on the first vertically extending front surface and a latching assembly that vertically slides along the second vertically extending front surface;

wherein the front of the second cart has a first vertically extending front surface positioned near the first side of the second cart and a second vertically extending front surface positioned near the second side of the second cart, the second cart further comprises a coupling arm positioned on the first vertically extending front surface and a latching assembly that vertically slides along the second vertically extending front surface;

wherein the first cart is coupled to the second cart by positioning the first cart next to the second cart such that the front of the first cart faces the front of the second cart, vertically sliding the latching assembly of the first cart along the second vertically extending front surface of the first cart such that the latching assembly of the first cart couples to the coupling arm of the second cart, and vertically sliding the latching assembly of the second cart along the second vertically extending front surface of the second cart such that the latching assembly of the second cart couples to the coupling arm of the first cart.

6. The modular cart assembly according to claim 5, wherein the coupling arm on the first vertically extending front surface of the first cart projects toward the second cart, and wherein coupling arm on the first vertically extending front surface of the second cart projects toward the first cart.

7. The modular cart assembly according to claim 5, wherein each latching assembly has a sleeve;

wherein each coupling arm has a pin that is vertically oriented;

wherein as the latching assembly of the first cart is slid along the second vertically extending front surface of the first cart the sleeve of the first cart mounts onto the pin of the second cart; and wherein as the latching assembly of the second cart is slid along the second vertically extending front surface of the second cart the sleeve of the second cart mounts onto the pin of the first cart.

8. The modular cart assembly according to claim 7, wherein the sleeve and the pin of the first cart project toward the second cart; and wherein the sleeve and the pin of the second cart project toward the first cart.

9. The modular cart assembly according to claim 8, wherein the latching assembly of the first cart is moveable between a locked position in which the sleeve of the first cart is mounted onto the pin of the second cart and an unlocked position in which the sleeve of the first cart is vertically spaced apart from the pin of the second cart; and wherein the latching assembly of the second cart is moveable between a locked position in which the sleeve of the second cart is mounted onto the pin of the first cart and an unlocked position in which the sleeve the second cart is vertically spaced apart from the pin of the first cart.

10. The modular cart assembly according to claim 9, wherein the first cart further comprises a spring that biases the latching assembly of the first cart toward the locked position; and wherein the second cart further comprises a spring that biases the latching assembly of the second cart toward the locked position.

11. A modular cart assembly comprising:

a first cart and a second cart that each extend from a first side to a second side in a lateral direction, from front to back in a transverse direction that is perpendicular to the lateral direction, and from top to bottom in a vertical direction that is perpendicular to the lateral direction and perpendicular to the transverse direction;

wherein the front of the first cart has a first front surface positioned near the first side of the first cart and a second front surface positioned near the second side of the first cart, the first cart further comprises a coupling arm positioned on the first front surface and a latching assembly that vertically slides along the second front surface;

wherein the front of the second cart has a first front surface positioned near the first side of the second cart and a second front surface positioned near the second side of the second cart, the second cart further comprises a coupling arm positioned on the first front surface and a latching assembly that vertically slides along the second front surface;

wherein the first cart is coupled to the second cart by positioning the first cart next to the second cart such that the front of the first cart faces the front of the second cart, vertically sliding the latching assembly of the first cart along the second front surface of the first cart such that the latching assembly of the first cart couples to the coupling arm of the second cart, and vertically sliding the latching assembly of the second cart along the second front surface of the second cart such that the latching assembly of the second cart couples to the coupling arm of the first cart;

wherein each latching assembly has a sleeve;

wherein each coupling arm has a pin that is vertically oriented;

wherein as the latching assembly of the first cart is slid along the second front surface of the first cart the sleeve of the first cart mounts onto the pin of the second cart;

wherein as the latching assembly of the second cart is slid along the second front surface of the second cart the sleeve of the second cart mounts onto the pin of the first cart;

wherein the sleeve and the pin of the first cart project toward the second cart, and wherein the sleeve and the pin of the second cart project toward the first cart;

wherein the latching assembly of the first cart is moveable between a locked position in which the sleeve of the first cart is mounted onto the pin of the second cart and an unlocked position in which the sleeve of the first cart is vertically spaced apart from the pin of the second cart;

wherein the latching assembly of the second cart is moveable between a locked position in which the sleeve of the second cart is mounted onto the pin of the first cart and an unlocked position in which the sleeve the second cart is vertically spaced apart from the pin of the first cart;

wherein the latching assembly of the first cart has a guide member on which the spring of the first cart is positioned;

wherein the first cart further comprises a guide bracket in which the guide member of the first cart is slidably received as the latching assembly of the first cart is moved to the unlocked position; and wherein the spring of the first cart is compressed between the latching assembly of the first cart and the guide bracket of the first cart as the latching assembly of the first cart is moved to the unlocked position.

12. A modular cart assembly comprising:

a first cart and a second cart that each extend from a first side to a second side in a lateral direction, from front to back in a transverse direction that is perpendicular to the lateral direction, and from top to bottom in a vertical direction that is perpendicular to the lateral direction and perpendicular to the transverse direction;

wherein the front of the first cart has a first front surface positioned near the first side of the first cart and a second front surface positioned near the second side of the first cart, the first cart further comprises a coupling arm positioned on the first front surface and a latching assembly that vertically slides along the second front surface;

wherein the front of the second cart has a first front surface positioned near the first side of the second cart and a second front surface positioned near the second side of the second cart, the second cart further comprises a coupling arm positioned on the first front surface and a latching assembly that vertically slides along the second front surface;

wherein the first cart is coupled to the second cart by positioning the first cart next to the second cart such that the front of the first cart faces the front of the second cart, vertically sliding the latching assembly of the first cart along the second front surface of the first cart such that the latching assembly of the first cart couples to the coupling arm of the second cart, and vertically sliding the latching assembly of the second cart along the second front surface of the second cart such that the latching assembly of the second cart couples to the coupling arm of the first cart;

wherein the first cart further comprises a first lift bracket positioned on the first front surface of the first cart and a second lift bracket positioned at the second front surface of the first cart, the first lift bracket is vertically spaced apart from the second lift bracket;

wherein the second cart further comprises a first lift bracket positioned on the first front surface of the second cart and a second lift bracket positioned at the second front surface of the second cart, the first lift bracket is vertically spaced apart from the second lift bracket; and wherein when the first cart is coupled to the second cart the first lift bracket of the first cart is vertically directly above the second lift bracket of the second cart and the first lift bracket of the second cart is vertically directly above the second lift bracket of the first cart such that the first lift bracket and the second lift bracket of the first cart and the first lift bracket and the second lift bracket of the second cart prevent the first cart from vertically moving relative to the second cart.

13. A modular cart assembly comprising:

a first cart having a latching assembly that vertically slides along the first cart, the latching assembly having a sleeve;

a second cart having a coupling arm with a pin; and wherein the first cart is coupled to the second cart by positioning the first cart next to the second cart and vertically sliding the latching assembly along the first cart until the latching assembly couples to the coupling arm;

wherein the latching assembly is moveable between a locked position in which the sleeve is mounted onto the pin and an unlocked position in which the sleeve is vertically spaced apart from the pin;

wherein the latching assembly has a guide member on which a spring is positioned such that the spring biases the latching assembly toward the locked position; and wherein the first cart further comprises a guide bracket in which the guide member slides as the latching assembly moves toward the unlocked position.

* * * * *